United States Patent
Wu

(10) Patent No.: US 11,741,621 B2
(45) Date of Patent: Aug. 29, 2023

(54) METHOD AND SYSTEM FOR DETECTING PLANE INFORMATION

(71) Applicant: QINGDAO PICO TECHNOLOGY CO., LTD., Shandong (CN)

(72) Inventor: Tao Wu, Shandong (CN)

(73) Assignee: QINGDAO PICO TECHNOLOGY CO., LTD., Qingdao (CN)

(*) Notice: Subject to any disclaimer, the term of this patent is extended or adjusted under 35 U.S.C. 154(b) by 0 days.

(21) Appl. No.: 17/816,377

(22) Filed: Jul. 29, 2022

(65) Prior Publication Data
US 2022/0366582 A1    Nov. 17, 2022

Related U.S. Application Data

(63) Continuation of application No. PCT/CN2021/118287, filed on Sep. 14, 2021.

(30) Foreign Application Priority Data

May 10, 2021    (CN) .......................... 202110505159.9

(51) Int. Cl.
G06T 7/00    (2017.01)
G06T 7/50    (2017.01)
G06T 7/10    (2017.01)

(52) U.S. Cl.
CPC .............. *G06T 7/50* (2017.01); *G06T 7/10* (2017.01); *G06T 2207/10028* (2013.01); *G06T 2207/20084* (2013.01)

(58) Field of Classification Search
CPC ... G06T 7/50; G06T 7/10; G06T 2207/10028; G06T 2207/20084; G06T 7/143; G06T 2207/10024; G06T 2207/20081; G06T 7/136; G06T 7/11
See application file for complete search history.

(56) References Cited

U.S. PATENT DOCUMENTS

| 9,613,388 | B2 * | 4/2017 | Loss ...................... G06T 15/04 |
| 2018/0218510 | A1 * | 8/2018 | Taguchi ................. G06V 10/44 |
| 2020/0402300 | A1 * | 12/2020 | Ding ...................... G06V 10/82 |

FOREIGN PATENT DOCUMENTS

| CN | 109993783 A | 7/2019 |
| CN | 110070570 A | 7/2019 |
| CN | 110197215 A | 9/2019 |

(Continued)

OTHER PUBLICATIONS

Search Report dated Jan. 1, 2022 for PCT Application No. PCT/CN2021/118287.

*Primary Examiner* — Ping Y Hsieh

(57) ABSTRACT

A method and system for detecting plane information are provided. The method includes: obtaining point cloud information of a physical environment of a user; performing an iterative regressing operation on the point cloud information to fit all plane information corresponding to the physical environment; merging all the plane information according to a preset rule to obtain a merged plane information set; performing plane segmentation on the plane information set based on a pre-trained plane segmentation model to obtain segmented plane information; and filtering the segmented plane information to determine all target plane information corresponding to the physical environment.

19 Claims, 2 Drawing Sheets

(56) References Cited

FOREIGN PATENT DOCUMENTS

| | | | |
|---|---|---|---|
| CN | 110264468 | A | 9/2019 |
| CN | 110458805 | A | 11/2019 |
| CN | 111507982 | A | 8/2020 |
| CN | 1 11639682 | A | 9/2020 |
| CN | 111639682 | * | 9/2020 |
| CN | 111882610 | A | 11/2020 |
| CN | 111932688 | A | 11/2020 |
| CN | 111985322 | A | 11/2020 |
| CN | 112184736 | A | 1/2021 |
| CN | 112329946 | A | 2/2021 |
| CN | 112365575 | A | 2/2021 |
| CN | 112396650 | A | 2/2021 |
| CN | 113240678 | A | 8/2021 |

* cited by examiner

METHOD AND SYSTEM FOR DETECTING PLANE INFORMATION

CROSS REFERENCE

This application is a continuation of PCT/CN2021/118287 filed on Sep. 14, 2021, which claims priority to Chinese Application No. 202110505159.9 filed with China National Intellectual Property Administration on May 10, 2021, the entirety of which is herein incorporated by reference.

TECHNICAL FIELD

The present disclosure relates to the technical field of plane detection, and in particular, to a method and system for detecting plane information.

BACKGROUND

At present, more and more integrated Virtual Reality (VR)/Augmented Reality (AR)/Mixed Reality (MR) devices emerge in the life of people. A main application scene of the integrated VR/AR/MR devices is that when a user performs VR/AR/MR scene interaction, some behavior track information of a hand or hands of the user is automatically recognized and tracked through a multi-lens tracking camera of a head-mounted device, gesture instructions are detected based on some behavior tracks of the hand or hands, so that the gesture instructions are used as input information of an artificial virtual reality system to achieve interaction with a virtual scene.

In the VR, AR or MR of the related art, human interacts with an object in a physical environment based on an object in a virtual scene. The most basic and common interaction object is a plane. The accuracy of plane detection often affects the basic experience of VR, AR or MR man-machine interaction. In different physical environments, for example, in places of different environments such as offices, shopping malls, living rooms and bedrooms, the plane environments are diversified, which increases the difficulty and complexity of plane detection.

At present, in the field of VR, AR or MR, point cloud data of a physical environment is mainly generated through a computing processor, plane detection and plane fitting are performed based on the point cloud data, and then various types of plane information in the physical environment are obtained. However, the method in the related art performs insufficient or excessive plane detection for certain scenes in a physical environment, which influences the accuracy and stability of plane detection.

SUMMARY

Embodiments of the present disclosure is to provide a method and system for detecting plane information, which can solve the problems that the method in the related art performs insufficient or excessive plane detection, which influences the accuracy and stability of plane detection.

The method for detecting plane information provided by the embodiments of the present disclosure includes: obtaining point cloud information of a physical environment of a user; performing an iterative regressing operation on the point cloud information to fit all plane information corresponding to the physical environment; merging all the plane information according to a preset rule to obtain a merged plane information set; performing plane segmentation on the plane information set based on a pre-trained plane segmentation model to obtain segmented plane information; and filtering the segmented plane information to determine all target plane information corresponding to the physical environment.

In addition, in an exemplary technical solution, a process of training the plane segmentation model includes: collecting plane image data, and performing data labeling on the plane image data to obtain a labeled plane image set; and training a neural network model based on the labeled plane image set until the neural network model converges to a preset range to form the plane segmentation model.

In addition, in an exemplary technical solution, the plane information includes all point cloud information in a current plane and two-dimensional image information corresponding to respective point cloud information; and the point cloud information is obtained through at least one head-mounted positioning and tracking module in a virtual reality display device.

In addition, in an exemplary technical solution, the process of performing the iterative regressing operation on the point cloud information includes: processing the point cloud information according to a RANSAC algorithm to fit all the plane information corresponding to the physical environment. The minimum number of pieces of point cloud information based on which the fitting is performed is 10.

In addition, in an exemplary technical solution, fitting all plane information corresponding to the physical environment includes: randomly obtaining a preset number of point clouds which are nearest to each other in the point cloud information, and performing plane fitting according to the RANSAC algorithm to obtain an initial plane; obtaining a normal vector of the initial plane; randomly obtaining a random point cloud in the point cloud information, performing plane fitting on the random point cloud and the point clouds of the initial plane, and obtaining a new normal vector; and determining a difference between the normal vector of the initial plane and the new normal vector, in a case where the difference meets a preset range, repeating iteration, otherwise, reserving the plane information of the last iteration until all the plane information is obtained.

In addition, in an exemplary technical solution, the preset range is from 1 cm to 4 cm.

In addition, in an exemplary technical solution, merging all the plane information according to a preset rule includes: determining an inclination angle between any two pieces of plane information in all the plane information, and judging, in a case where the inclination angle meets a first threshold, whether the number of point clouds for which a distance between three-dimensional spatial point clouds on the two pieces of plane information is within a preset value meets a second threshold; and in a case where the inclination angle meets the first threshold and the number of point clouds meets the second threshold, merging the two pieces of plane information.

In addition, in an exemplary technical solution, the first threshold is from 4° to 12°; and the second threshold is from 8 to 20.

In addition, in an exemplary technical solution, filtering the segmented plane information includes: obtaining an occupation ratio of the number of pixel points of each plane in the segmented plane information in a corresponding plane of the plane information set; and in a case where the occupation ratio meets a preset threshold, determining that the plane information is target plane information of the physical environment.

According to another aspect of the embodiments of the present disclosure, a system for detecting plane information is provided. The system includes: a point cloud information obtaining unit, configured to obtain point cloud information of a physical environment of a user; a plane information fitting unit, configured to perform an iterative regressing operation on the point cloud information to fit all plane information corresponding to the physical environment; a plane information set obtaining unit, configured to merge all the plane information according to a preset rule to obtain a merged plane information set; a segmentation processing unit, configured to perform plane segmentation on the plane information set based on a pre-trained plane segmentation model to obtain segmented plane information; and a target plane information determining unit, configured to filter the segmented plane information to determine all target plane information corresponding to the physical environment.

By utilizing the above method and system for detecting plane information, point cloud information of a physical environment of a user is obtained; an iterative regressing operation is performed on the point cloud information to fit all plane information corresponding to the physical environment; all the plane information is merged according to a preset rule to obtain a merged plane information set; plane segmentation is performed on the plane information set based on a pre-trained plane segmentation model to obtain segmented plane information; and the segmented plane information is filtered to determine all target plane information corresponding to the physical environment. Plane information of a room environment can be stably extracted, the extraction accuracy is high, and the application range is wide.

One or more aspects of the embodiments of the present disclosure include features that will be explained in detail later. The following description and drawings describe some exemplary aspects of the embodiments of the present disclosure in detail. However, the exemplary aspects only indicate some of various ways allowing usage of principles of the embodiments of the present disclosure. The present disclosure is intended to include all the aspects and equivalents of these aspects.

BRIEF DESCRIPTION OF THE DRAWINGS

Other objects and results of the embodiments of the present disclosure will become more apparent and easily understood by reference to the following description taken in conjunction with the accompanying drawings, and as the embodiments of the present disclosure become more fully understood. In the drawings.

The same reference numbers in all drawings indicate similar or corresponding features or functions.

DETAILED DESCRIPTION OF THE EMBODIMENTS

Figure 1:
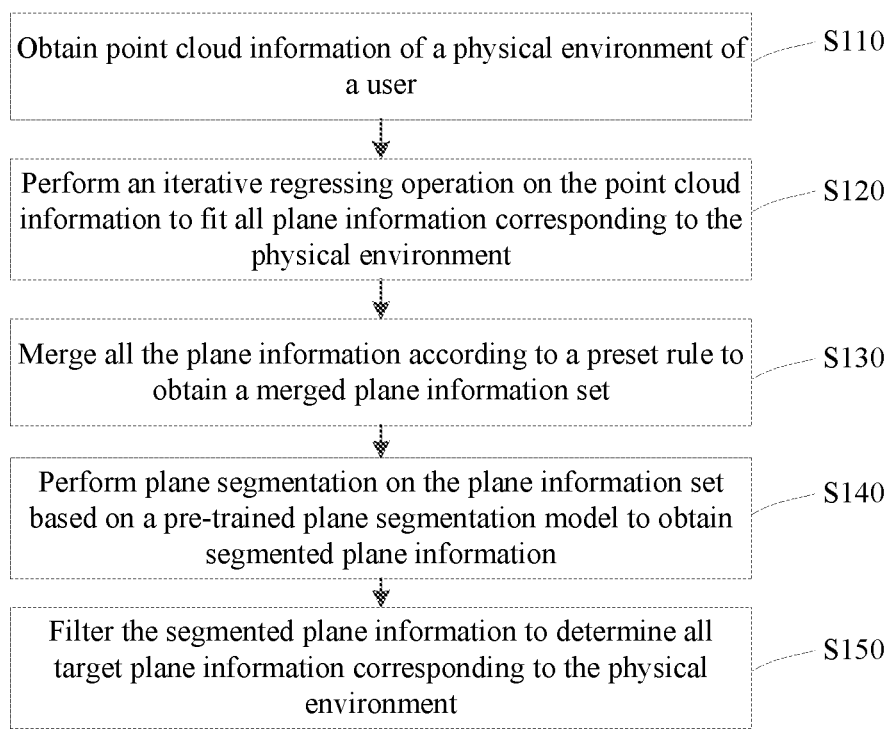
FIG. 1 is a flowchart of a method for detecting plane information according to some embodiments of the present disclosure.

In the following description, for purposes of explanation, numerous exemplary details are set forth in order to provide a thorough understanding of one or more embodiments. It is apparent, however, that these embodiments may be practiced without these exemplary details. In other examples, well-known structures and devices are shown in a block diagram in order to facilitate describing one or more embodiments.

In the description of the embodiments of the present disclosure, it should be understood that the orientation or positional relationship indicated by the terms "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", "circumferential", etc. is based on the orientation or positional relationship shown in the drawings, and is only for the convenience of describing the embodiments of the present disclosure and simplifying the description, rather than indicating or implying that the device or element referred must have a specific orientation, be constructed and operated in a specific orientation, and therefore cannot be understood as a limitation of the present disclosure.

In order to describe the method and system for detecting plane information according to embodiments of the present disclosure in detail, exemplary embodiments of the present disclosure will be described below in conjunction with the accompanying drawings.

FIG. 1 shows a flow of a method for detecting plane information according to some embodiments of the present disclosure.

As shown in FIG. 1, the method for detecting plane information according to some embodiments of the present disclosure mainly includes the following operations.

At S110, point cloud information of a physical environment of a user is obtained.

At S120, an iterative regressing operation is performed on the point cloud information to fit all plane information corresponding to the physical environment.

At S130, all the plane information is merged according to a preset rule to obtain a merged plane information set.

At S140, plane segmentation is performed on the plane information set based on a pre-trained plane segmentation model to obtain segmented plane information.

At S150, the segmented plane information is filtered to determine all target plane information corresponding to the physical environment.

The method for detecting plane information according to the embodiments of the present disclosure mainly includes two stages: a training stage of a plane segmentation model, and a stage of obtaining target plane information based on the plane segmentation model. The two stages are described respectively below with reference to exemplary embodiments.

In some exemplary implementations, a process of training the plane segmentation model includes: collecting plane image data, and performing data labeling on the plane image data to obtain a labeled plane image set; and training a neural network model based on the labeled plane image set until the neural network model converges to a preset range to form the plane segmentation model.

As a specific example, a virtual reality display device (e.g., HMD) may be used for collecting plane image data of various scenes, such as plane image data of desk top, ground, conference table top and other office scenes, plane image data of a living room environment in a home, such as a living room dining table, a living room ground or a living room tea table, and plane image data of other environment scenes. A total of 3 million plane image data are collected to form a plane image data set, and then plane data labeling is performed on each image data in the plane image data set to obtain a corresponding labeled plane image set. Then, the plane segmentation model is trained based on a neural network model until a high-accuracy plane segmentation model is obtained.

Further, at least one head-mounted positioning and tracking sensor, typically at least one fish-eye wide-angled camera, is arranged in the virtual reality display device (e.g., HMD). Two or more fish-eye wide-angled cameras are typically arranged in the virtual reality display device (e.g., HMD). For example, in the method for detecting plane information of the embodiments of the present disclosure, the plane segmentation model may be trained based on image data obtained by the fish-eye wide-angled cameras arranged in the HMD.

In operation S110, point cloud information of a physical environment of a user may be obtained through at least one head-mounted positioning and tracking sensor of the HMD. A point cloud mainly refers to a set formed by massive points having target surface characteristics. The point cloud obtained according to a laser measurement principle includes three-dimensional coordinates and laser reflection intensity, and the point cloud obtained according to a photogrammetry principle includes three-dimensional coordinates and color information. The point cloud information in the embodiments of the present disclosure may include three-dimensional coordinates, color information, and laser reflection intensity of massive points having target surface characteristics.

Further, an iterative regressing operation is performed on the obtained point cloud information to fit all plane information corresponding to the physical environment. The plane information includes all point cloud information in a current plane and two-dimensional image information corresponding to respective point cloud information; and the point cloud information is obtained through at least one head-mounted positioning and tracking module in a virtual reality display device.

As a specific example, the process of performing the iterative regressing operation on the point cloud information may include: processing the point cloud information according to a RANSAC algorithm to fit all the plane information corresponding to the physical environment. In order to improve the accuracy and stability of plane fitting, the minimum number of pieces of point cloud information based on which the fitting is performed may be set to 10.

Further, the process of fitting all plane information corresponding to the physical environment includes: randomly obtaining a preset number of point clouds which are nearest to each other in the point cloud information, and performing plane fitting according to the RANSAC algorithm (for example, randomly obtaining 10 point clouds nearest to each other for plane fitting) to obtain an initial plane; then, obtaining a normal vector of the initial plane; randomly obtaining a random point cloud in the point cloud information, performing plane fitting on the random point cloud and the point clouds of the initial plane, and obtaining a new normal vector; and determining a difference between the normal vector of the initial plane and the new normal vector, in a case where the difference meets a preset range (for example, from 1 cm to 4 cm), repeating iteration, continuing to randomly obtain a point cloud in the point cloud information (pool) and continuing to perform plane fitting; otherwise, in a case where the difference is greater than the preset range, reserving the plane information of the last iteration; and then, continuing to randomly obtain a preset number of point clouds which are nearest to each other in the point cloud information for plane fitting until all the plane information is obtained to form a plane information set.

In operation S130, the process of merging all the plane information according to a preset rule includes: determining an inclination angle between any two pieces of plane information in all the plane information, and judging, in a case where the inclination angle meets a first threshold, whether the number of point clouds for which a distance between three-dimensional spatial point clouds on the two pieces of plane information is within a preset value meets a second threshold; and in a case where the inclination angle meets the first threshold and the number of point clouds meets the second threshold, merging the two pieces of plane information.

In an exemplary implementation of the embodiments of the present disclosure, the first threshold may be set to from 4° to 12°, and the second threshold may be set to from 8 to 20.

As an example, for all plane information, in a case where an inclination angle between any two pieces of plane information is within 8° and the number of point clouds for which a distance between nearest three-dimensional spatial point clouds on the two pieces of plane information is within 10 cm exceeds 10, the two pieces of plane information are merged and a piece of merged plane information is obtained. In the merging process, the point cloud information corresponding to the two pieces of plane information may be combined together, and then plane fitting is performed once so as to obtain the merged plane information.

And then, all the detected planes are judged and merged according to a judgment standard of the preset rule to obtain all the plane information of the corresponding physical environment as a merged plane information set.

In operation S140, all the plane information in the plane information set is subjected to plane segmentation through the trained plane segmentation model. Since there may be a false detection probability of non-plane before segmentation, i.e. the plane in the physical environment obtained in the above operation may have a false detection probability, the detected plane information may be further confirmed in combination with semantic information through plane segmentation to accurately obtain plane information of a real physical environment.

After segmented plane information is obtained, the segmented plane information is further filtered. The process of filtering includes: obtaining an occupation ratio of the number of pixel points of each plane in the segmented plane information in a corresponding plane of the plane information set; and in a case where the occupation ratio meets a preset threshold, determining that the plane information is target plane information of the physical environment.

For example, an occupation ratio of the number of pixel points of each plane in the segmented plane information in a corresponding plane of the plane information set is calculated. If the occupation ratio is more than 85% (the occupation ratio threshold may be set and adjusted according to specific application scenes or requirements), it is confirmed that the corresponding plane is the plane information in the physical environment, namely the plane information can be used as target plane information. According to the filtering mode, all the segmented plane information is filtered to obtain all the target plane information of the corresponding physical environment.

The pixel points correspond to two-dimensional points, the spatial point clouds correspond to three-dimensional spatial points, and each pixel point corresponds to a three-dimensional spatial point cloud.

Figure 2:
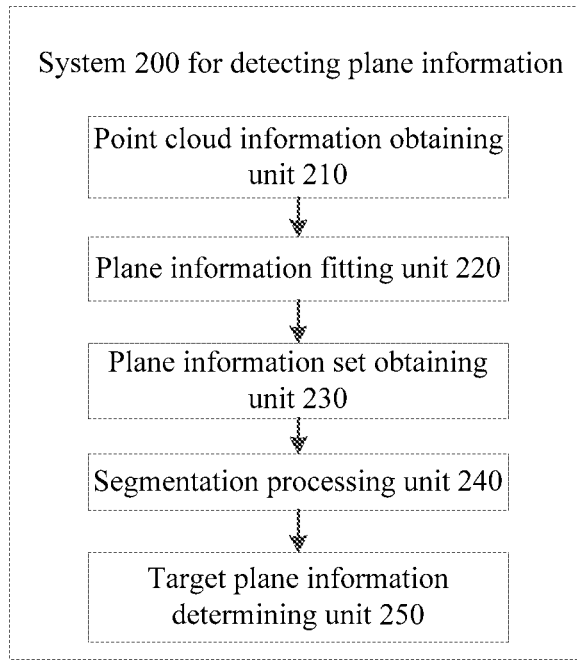
FIG. 2 is a logic block diagram of a system for detecting plane information according to some embodiments of the present disclosure.

The embodiments of the present disclosure also provide a system for detecting plane information corresponding to the above method for detecting plane information. FIG. 2 shows a schematic logic of a system for detecting plane information according to some embodiments of the present disclosure.

As shown in FIG. 2, the system 200 for detecting plane information according to some embodiments of the present disclosure may include:

a point cloud information obtaining unit 210, configured to obtain point cloud information of a physical environment of a user;

a plane information fitting unit 220, configured to perform an iterative regressing operation on the point cloud information to fit all plane information corresponding to the physical environment;

a plane information set obtaining unit 230, configured to merge all the plane information according to a preset rule to obtain a merged plane information set;

a segmentation processing unit 240, configured to perform plane segmentation on the plane information set based on a pre-trained plane segmentation model to obtain segmented plane information; and a target plane information determining unit 250, configured to filter the segmented plane information to determine all target plane information corresponding to the physical environment.

It should be noted that the above embodiments of the system for detecting plane information can be described with reference to the embodiments of the method for detecting plane information and thus will not be described in detail here.

By utilizing the method and system for detecting plane information provided in the embodiments of the present disclosure, the detection and extraction of a plane of a physical environment are realized by combining a semantic segmentation technology based on an artificial neural network model, and the precision and stability of plane detection of the physical environment can be improved.

The method and system for detecting plane information according to the embodiments of the present disclosure are described by way of example with reference to the accompanying drawings. However, those having ordinary skill in the art should understand that various improvements can be made to the method and system for detecting plane information proposed in the embodiments of the present disclosure, without departing from the content of the embodiments of the present disclosure. Therefore, the scope of protection of the present disclosure should be determined by the content of the appended claims.

Specific examples in the embodiments of the present embodiment may refer to the examples described in the above embodiments and exemplary implementations, and details are not described herein in the embodiments.

It is apparent that those having ordinary skill in the art should understand that the above modules or operations of the embodiments of the present disclosure may be implemented by a general-purpose computing device, and they may be centralized on a single computing device or distributed on a network composed of multiple computing devices. They may be implemented with program codes executable by a computing device, so that they may be stored in a storage device and executed by the computing device, and in some cases, the operations shown or described may be performed in a different order than here, or they are separately made into individual integrated circuit modules, or multiple modules or operations therein are made into a single integrated circuit module for implementation. As such, the embodiments of the present disclosure are not limited to any particular combination of hardware and software.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the embodiments of the present disclosure shall fall within the scope of protection of the present disclosure.

INDUSTRIAL APPLICABILITY

As described above, the method for detecting plane information provided by the embodiments of the present disclosure has the following beneficial effects. By utilizing the above method and system for detecting plane information, point cloud information of a physical environment of a user is obtained; an iterative regressing operation is performed on the point cloud information to fit all plane information corresponding to the physical environment; all the plane information is merged according to a preset rule to obtain a merged plane information set; plane segmentation is performed on the plane information set based on a pre-trained plane segmentation model to obtain segmented plane information; and the segmented plane information is filtered to determine all target plane information corresponding to the physical environment. Plane information of a room environment can be stably extracted, the extraction accuracy is high, and the application range is wide.

What is claimed is:

1. A method for detecting plane information, comprising:
    obtaining point cloud information of a physical environment of a user;
    performing an iterative regressing operation on the point cloud information to fit all plane information corresponding to the physical environment, the plane information comprises all point cloud information in a current plane and two-dimensional image information corresponding to respective point cloud information, and the point cloud information is obtained through at least one head-mounted positioning and tracking module in a virtual reality display device;
    merging all the plane information according to a preset rule to obtain a merged plane information set;
    performing plane segmentation on the plane information set based on a pre-trained plane segmentation model to obtain segmented plane information; and
    filtering the segmented plane information to determine all target plane information corresponding to the physical environment.

2. The method for detecting plane information according to claim 1, wherein a process of training the plane segmentation model comprises:
    collecting plane image data, and performing data labeling on the plane image data to obtain a labeled plane image set; and
    training a neural network model based on the labeled plane image set until the neural network model converges to a preset range to form the plane segmentation model.

3. The method for detecting plane information according to claim 1, wherein performing the iterative regressing operation on the point cloud information comprises:

processing the point cloud information according to a RANSAC algorithm to fit all the plane information corresponding to the physical environment, wherein the minimum number of pieces of point cloud information based on which the fitting is performed is 10.

4. The method for detecting plane information according to claim 3, wherein fitting all plane information corresponding to the physical environment comprises:
randomly obtaining a preset number of point clouds which are nearest to each other in the point cloud information, and performing plane fitting according to the RANSAC algorithm to obtain an initial plane;
obtaining a normal vector of the initial plane;
randomly obtaining a random point cloud in the point cloud information, performing plane fitting on the random point cloud and the point clouds of the initial plane, and obtaining a new normal vector; and
determining a difference between the normal vector of the initial plane and the new normal vector, in a case where the difference meets a preset range, repeating iteration, otherwise, reserving the plane information of the last iteration until all the plane information is obtained.

5. The method for detecting plane information according to claim 4, wherein
the preset range is from 1 cm to 4 cm.

6. The method for detecting plane information according to claim 1, wherein merging all the plane information according to a preset rule comprises:
determining an inclination angle between any two pieces of plane information in all the plane information, and judging, in a case where the inclination angle meets a first threshold, whether the number of point clouds for which a distance between three-dimensional spatial point clouds on the two pieces of plane information is within a preset value meets a second threshold; and
in a case where the inclination angle meets the first threshold and the number of point clouds meets the second threshold, merging the two pieces of plane information.

7. The method for detecting plane information according to claim 6, wherein
the first threshold is from 4° to 12°; and
the second threshold is from 8 to 20.

8. The method for detecting plane information according to claim 1, wherein filtering the segmented plane information comprises:
obtaining an occupation ratio of the number of pixel points of each plane in the segmented plane information in a corresponding plane of the plane information set; and
in a case where the occupation ratio meets a preset threshold, determining that the plane information is target plane information of the physical environment.

9. A non-transitory computer-readable storage medium, having a computer program stored thereon which, when executed by a processor, implements the method according to claim 1.

10. An electronic device, comprising a memory and a processor, wherein the memory stores a computer program, and the processor is configured to execute the computer program to perform the method according to claim 1.

11. The method for detecting plane information according to claim 1, wherein a point cloud refers to a set formed by massive points having target surface characteristics.

12. The method for detecting plane information according to claim 11, wherein the point cloud obtained according to a laser measurement principle comprises three-dimensional coordinates and laser reflection intensity.

13. The method for detecting plane information according to claim 11, wherein the point cloud obtained according to a photogrammetry principle comprises three-dimensional coordinates and color information.

14. The method for detecting plane information according to claim 1, wherein the point cloud information comprises three-dimensional coordinates, color information, and laser reflection intensity of massive points having target surface characteristics.

15. The method for detecting plane information according to claim 1, wherein performing plane segmentation on the plane information set based on a pre-trained plane segmentation model to obtain segmented plane information comprises:
performing plane segmentation on the plane information set in combination with semantic information based on the pre-trained plane segmentation model to obtain the segmented plane information.

16. A system for detecting plane information, comprising a memory storing instructions and a processor in communication with the memory, wherein the processor is configured to execute the instructions to:
obtain point cloud information of a physical environment of a user;
perform an iterative regressing operation on the point cloud information to fit all plane information corresponding to the physical environment, the plane information comprises all point cloud information in a current plane and two-dimensional image information corresponding to respective point cloud information, and the point cloud information is obtained through at least one head-mounted positioning and tracking module in a virtual reality display device;
merge all the plane information according to a preset rule to obtain a merged plane information set;
perform plane segmentation on the plane information set based on a pre-trained plane segmentation model to obtain segmented plane information; and
filter the segmented plane information to determine all target plane information corresponding to the physical environment.

17. The system for detecting plane information according to claim 16, wherein the processor is configured to execute the instructions to:
collect plane image data, and perform data labeling on the plane image data to obtain a labeled plane image set; and
train a neural network model based on the labeled plane image set until the neural network model converges to a preset range to form the plane segmentation model.

18. The system for detecting plane information according to claim 16, wherein the processor is configured to execute the instructions to:
process the point cloud information according to a RANSAC algorithm to fit all the plane information corresponding to the physical environment, wherein the minimum number of pieces of point cloud information based on which the fitting is performed is 10.

19. The system for detecting plane information according to claim 18, wherein the processor is configured to execute the instructions to:
randomly obtain a preset number of point clouds which are nearest to each other in the point cloud information, and perform plane fitting according to the RANSAC algorithm to obtain an initial plane;

obtain a normal vector of the initial plane;
randomly obtain a random point cloud in the point cloud information, perform plane fitting on the random point cloud and the point clouds of the initial plane, and obtain a new normal vector; and
determine a difference between the normal vector of the initial plane and the new normal vector, in a case where the difference meets a preset range, repeat iteration, otherwise, reserve the plane information of the last iteration until all the plane information is obtained.

* * * * *